United States Patent [19]

Danforth et al.

[11] Patent Number: 4,921,897

[45] Date of Patent: May 1, 1990

[54] FLAME RETARDANT COMPOSITION CONTAINING ZINC BORATE

[75] Inventors: Richard L. Danforth, Missouri City; Darlene G. Smith, Bellville, both of Tex.

[73] Assignee: Shell Oil Company, Houston, Tex.

[21] Appl. No.: 332,249

[22] Filed: Mar. 31, 1989

[51] Int. Cl.$^5$ .................. C08G 3/26; C08G 67/02
[52] U.S. Cl. .................. 524/405; 524/424; 524/425; 524/427; 524/432
[58] Field of Search .............. 524/405, 424, 425, 427, 524/432

[56] References Cited

U.S. PATENT DOCUMENTS

| | | | |
|---|---|---|---|
| 2,495,286 | 1/1950 | Brubaker | 528/392 |
| 3,694,412 | 9/1972 | Nozaki | 528/392 |
| 3,718,615 | 2/1973 | Woods et al. | 524/405 |
| 4,761,449 | 8/1988 | Lutz | 524/424 |

FOREIGN PATENT DOCUMENTS

| | | |
|---|---|---|
| 0121965 | 10/1984 | European Pat. Off. . |
| 0181014 | 5/1986 | European Pat. Off. . |
| 222454 | 5/1987 | European Pat. Off. . |
| 257663 | 3/1988 | European Pat. Off. . |
| 0113845 | 10/1974 | Japan . |
| 0123638 | of 1980 | Japan . |
| 1081304 | 3/1965 | United Kingdom . |

*Primary Examiner*—Harold D. Anderson
*Assistant Examiner*—T. Mosley
*Attorney, Agent, or Firm*—Dean F. Vance

[57] ABSTRACT

Flame retardant compositions comprise linear alternating polymers of carbon monoxide and at least one ethylenically unsaturated hydrocarbon and a minor quantity, relative to the polymer, of a zinc borate or barium borate.

18 Claims, No Drawings

FLAME RETARDANT COMPOSITION CONTAINING ZINC BORATE

FIELD OF THE INVENTION

Compositions comprising carbon monoxide/ethylenically unsaturated hydrocarbon polymers and certain zinc borates demonstrate improved flame retardancy.

BACKGROUND OF THE INVENTION

The general class of polymers of carbon monoxide and one or more ethylenically unsaturated hydrocarbons has been known for some years. Brubaker, U.S. Pat. No. 2,495,286, produced such polymers of relatively low carbon monoxide content in the presence of free radical catalysts such as benzoyl peroxide. British Patent 1,081,304 produced such polymers of higher carbon monoxide content in the presence of alkylphosphine complexes of palladium as catalyst. Nozaki extended the process to arylphosphine complexes of palladium. See, for example, U.S. Pat. No. 3,694,412.

More recently, the class of linear alternating polymers of carbon monoxide and unsaturated hydrocarbons, now known as polyketones, has become of greater interest, in part because of improved methods of production. Such methods are shown by European Patent Applications 181,014, 121,965, 222,454 and 257,663. The disclosed processes employ, inter alia, a compound of a Group VIII metal such as palladium, an anion of a non-hydrohalogenic acid having a pKa below 2 and a bidentate ligand of phosphorus. The resulting polymers are generally high molecular weight thermoplastic polymers having utility in the production of articles such as containers for food and drink and parts for the automotive industry or structural members for use in the construction industry.

With regard to any plastic material employed in a public application, some concern must be shown for the consequences of the material catching fire and burning. Many plastics, e.g., polyvinylchloride, produce highly toxic gases upon combustion. The use of polyketones has advantages in this regard since only atoms of carbon, hydrogen and oxygen are present in the polymer molecule. Nevertheless, it would be of advantage to provide for flame retardant compositions of polyketone polymers.

Others in the past have attempted to improve the flame retardancy of polyketone compositions. For example, U.S. Pat. No. 4,761,449 discloses compositions containing a carbon monoxide/ethylenically unsaturated hydrocarbon copolymer with an alkaline earth metal carbonate, such as calcium carbonate. While these compositions show improved flame retardancy they still have certain deficiencies. In particular, the compositions containing up to 25% calcium carbonate still have Limiting Oxygen Index (LOI) values of only 27-27.5. LOI values of 30 or greater are required for man commercial applications. In addition, the mechanical properties of the flame retardant compositions must remain high if the compositions are to have commercial significance. Therefore, it is important that the amount of flame retardant necessary to obtain commercial compositions be as small as possible.

SUMMARY OF THE INVENTION

This invention relates to flame-retardant compositions of linear alternating polymers of carbon monoxide and at least one ethylenically unsaturated hydrocarbon. More particularly, the invention relates to compositions of such polymers incorporating a flame-retardant quantity of a zinc borate or barium borate. Compositions according to the present invention not only have high LOI values, but also have good mechanical values (i.e. high modulus and impact). Still further, these compositions are non-toxic, i.e. they do not release toxic fumes such as HCl or HF gases.

COPENDING PATENT APPLICATIONS

Copending U.S. ptent application Ser. No. 332,250, filed Mar. 31, 1989 now U.S. Pat. No. 4,885,328 (titled "Flame Retardant Compositions") discloses and claims a flame retardant composition comprising a polyketone polymer and certain alkaline earth metal hydroxides, such as magnesium hydroxides.

Copending U.S. patent application Ser. No. 332,636, filed Mar. 31, 1989 now U.S. Pat. No. 4,885,318 (titled "Polyketone Flame Retardant Composition") discloses and claims a flame retardant composition with a polyketone polymer and various flame retardants, including antimony trioxide and decabromo diphenyloxide.

DESCRIPTION OF THE INVENTION

The polymers from which the compositions of the invention are produced are linear alternating polymers of carbon monoxide and at least one ethylenically unsaturated hydrocarbon. Suitable ethylenically unsaturated hydrocarbons have up to 20 carbon atoms inclusive, preferably up to 10 carbon atoms inclusive and are wholly aliphatic such as ethylene and other α-olefins including propylene, butene-1, octene-1 and dodecene-1 or are arylaliphatic containing an aryl substituent on an otherwise aliphatic molecule, particularly an aryl substituent on a carbon atom of the ethylenic unsaturation. Illustrative of this latter class of olefins are styrene, p-methylstyrene, m-methylstyrene and p-ethylstyrene. Preferred polyketone polymers are copolymers of carbon monoxide and ethylene or terpolymers of carbon monoxide, ethylene and a second aliphatic α-olefin of 3 or more carbon atoms, particularly propylene.

Of particular interest are those polymers of molecular weight from about 1,000 to about 200,000, particularly those of molecular weight from about 10,000 to about 50,000, and containing substantially equimolar quantities of carbon monoxide and ethylenically unsaturated hydrocarbon.

Such polymers are typically produced by contactiong the carbon monoxide and the ethylenically unsaturated hydrocarbon(s) under polymerization conditions in the presence of a catalytic amount of a catalyst formed from a compound of the Group VIII metals palladium, cobalt or nickel, the anion of a non-hyrohalogenic acid of a pKa less than about 6, preferably less than about 2, and a bidentate ligand of phosphorus, sulfur, arsenic or antimony. Although the scope of the polymerization is extensive, for purposes of illustration a preferred Group VIII metal compound is palladium acetate, the anion is the anion of an acid selected from trifluoroacetic acid and para-toluenesufonic acid and the bidentate ligand is selected from 1,3-bis(diphenylphosphino)propane and 1,3-bis[di(2-methoxyphenyl)phosphino]propane.

Polymerization is carried out at polymerization conditions, typically at elevated temperature and pressure, in the gaseous phase or in the liquid phase in the presence of an inert diluent, e.g., a lower alkanol such as methanol or ethanol. The reactants are contacted by conventional methods such as stirring or shaking and subsequent to reaction the polymer product is recovered as by decantation or filtration. The polymer product may contain metallic residues from the catalyst which are removed by contact with a solvent which is selective for the residues. Production of these polymers is illustrated, for example, by published European Patent Applications 181,014, 121,965, 222,454 and 257,663.

The physical properties of the polymer will be determined in part by the molecular weight and by whether the polymer is a copolymer or a terpolymer. Typical melting points are from about 175° C. to about 300° C., more typically from about 210° C. to about 280° C. The structure of the preferred polymers is that of a linear alternating polymer of carbon monoxide, ethylene and any second ethylenically unsaturated hydrocarbon. When terpolymers of carbon monoxide, ethylene and a second ethylenically unsaturated hydrocarbon, e.g., a hydrocarbon of at least 3 carbon atoms, are produced there will be at least two units incorporating moieties of ethylene per unit incorporating a moiety of the second unsaturated hydrocarbon, preferably from about 10 units to about 100 units incorporating moieties of ethylene per unit incorporating a moiety of the second unsaturated hydrocarbon. The polymer chain of the preferred class of polymers is illustrated by the formula

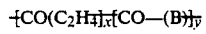

wherein B is the moiety obtained by polymerization of the second ethylenically unsaturated hydrocarbon through the ethylenic unsaturation.

The $-CO(C_2H_4)-$ units and the $-CO(B)-$ units occur randomly throughout the polymer molecule and the ratio of y:x is no more than about 0.5. In the modification of the invention which employs copolymers of carbon monoxide and ethylene without the presence of a second ethylenically unsaturated hydrocarbon, the term y is zero and the ratio of y:x is also zero. When terpolymers are employed, i.e., y is greater than zero, ratios of y:x from about 0.01 to about 0.1 are preferred. The end groups or "caps" of the polymer chain will depend on the particular materials present during its production and whether and how the polymer has been purified. The precise nature of the end groups is of little significance with regard to the overall properties of the polymer so that the polymer is fairly represented by the polymer chain as depicted above.

The flame retardant compositions of the invention contain a flame retarding quantity of a zinc borate or barium borate, preferably a zinc borate. The typical composition of zinc borate is $xZnO.yB_2O_3$, and is usually available in the hydrated form. A preferred zinc borate has the formula $2ZnO.3B_2O_3.3.5H_2O$. Due to slight amounts or impurities and analytical errors, the $H_2O$ content can vary between about 3.3 and 3.7 but it will generally average about $3.5H_2O$. It will be appreciated that this zinc borate has a much lower degree of water hydration than many other zinc borates. Due to the low amount of water of hydration there is less problem with this zinc borate when it is added to polymeric material with regard to formation of bubbles than with other zinc borates or other inorganic materials during processing, molding and curing. When the specific zinc borate is added to polymers, fire resistance of the polymers is greatly improved while the other physical properties of the polymers are not deteriorated.

A method for producing the zinc borate of low hydration is set forth in U.S. Pat. No. 3,549,316, and its use with certain halogenated polymeric compositions is disclosed in U.S. Pat. No.3,718,615.

The preferred zinc borate is available commercially under the tradename Firebrake ® ZB flame retardant.

The zinc borate is employed in an amount sufficient to render the resulting composition flame retardant. Compositions from about 2 to about 50 percent by weight, based on the total composition, of the zinc borate are preferred. More preferred are compositions having about 15 to about 40 percent by weight zinc borate.

In an alternative embodiment an alkaline earch metal carbonate is also incorporated in the composition to replace a portion of the zinc borate. One of the considerations in adding the carbonate is cost.

By alkaline earth metal carbonate is meant a carbonate salt of a metal of Group IIA of the Periodic Table of Elements. While carbonate salts of berylium, magnesium, calcium, strontium and barium are suitable, the preferred flame retarding carbonate salts are carbonates of magnesium and calcium, particularly calcium. If desired the $CaCO_3$ may be surface treated to improve dispersion. Such surface treatments include treatment with stearic acid or salts of stearic acid.

The alkaline earth metal carbonate is typically provided in the form of a fine powder, for example, above about 0.04 $\mu$m but below about 100 $\mu$m. The alkaline earth metal carbonate is preferably employed as such, but in alternate modifications alkaline earth metal compounds may be utilized which serve to generate alkaline earth metal carbonates during processing or upon exposure of the resulting composition to heat at temperatures lower than those at which flame would result. An example of a material useful as an alkaline earth metal carbonate precursor is the corresponding alkaline earth metal bicarbonate.

The following relative amounts of polymer, zinc borate and alkaline earth metal carbonate are suitable (expressed in weight percent of the total composition):

|  | Preferred | More Preferred |
|---|---|---|
| Polyketone Polymer | about 60 to about 85% | about 60 to about 85% |
| zinc borate | about 5 to about 30% | about 20 to about 30% |
| alkaline earth metal carbonate | about 5 to about 20% | about 5 to about 10% |

Note the percentages should add up to 100 percent in actual compositions.

The relative amount of zinc borate to alkaline earth metal carbonate should be 1:1 or greater, preferably the weight ratio should be at least 2:1, for example between 2:1 and 3:1.

The zinc borates may be employed with other materials such as ammonium thiosulfate, asbestos, alkali metal carbonates or bicarbonates, e.g., potassium bicarbonate or stannous or stanic oxide. The preferred compositions of the invention, however, are those wherein zinc borate is employed as substantially the sole material used to impart flame retardancy to the polyketone composition.

The flame retardant compositions are produced by mixing the zinc borate throughout the polyketone polymer. The method of forming the composition is not critical so long as the method results in a uniform mixture of zinc borate throughout at least the outer layer of the polyketone polymer. In a preparation of a composition useful in the form in which it is produced, only the outermost portion of the composition need be provided with zinc borate. However, in most applications, a flame retardant composition is produced which is then processed further and in such applications the production of a substantially uniform mixture of polyketone polymer and zinc borate is preferred. In one modification, the compositions are produced by dry blending the components in particulate form and converting to a substantially uniform composition by application of heat and pressure. Alternatively, the compositions are produced by heating the polyketone polymer until molten and the zinc borate thereof is mixed throughout the polymer by use of a high-shear mixer or extruder.

The polymer composition, in addition to polymer and zinc borate, may incorporate other conventional additives which do not detract from the flame retardant character of the composition. Examples of such additives are plasticizers, mold release agents and antioxidants which are added by blending or other conventional methods together with or separately from the zinc borate.

The flame retarfdant compositions are processed by injection molding, pressure forming or other conventional fabrication methods. They are characterized by the same combination of good impact, stiffness and heat resistant properties found in the neat polymer, and in addition have excellent flame retardancy. The compositions of this invention are useful in a variety of applications, particularly where exposure to elevated temperature is likely to be encountered. The compositions are useful in the production of parts for the automotive industry, electronics industry and electrical industry. The compositions are particularly useful for those automotive parts located within the engine compartment where high temperatures are encountered or those parts which encounter heat as during the baking of painted surfaces, e.g. wire coatings, connectors, etc.

The compositions of the invention are further illustrated by the following Comparative Examples and Illustrative Embodiments which should not be construed as limiting the invention.

Illustrative Embodiment I

A first terpolymer (Polymer 1) of carbon monoxide, ethylene and propylene was prepared in the presence of a catalyst formed from palladium acetate, trifluoroacetic acid and 1,3-bis(diphenylphosphino)propane. The polymer had a melting point of 219° C. and a limiting viscosity number (LVN) of 1.60 measured at 60° C. in m-cresol. A second terpolymer (Polymer 2) of carbon monoxide, ethylene and propylene was prepared in the presence of a catalyst formed from palladium acetate, trifluoroacetic acid and 1,3-bis[di(2-methoxyphenyl)-phosphino]propane. The second terpolymer had a melting poit of 221° C. and a LVN of 1.83 measured at 60° C. in m-cresol.

Comparative Example I

Polymer 1 of Illustrative Embodiment I was blended with different weight percents of calcium carbonate by use of a twin-screw extruder to extruder to produce nibs. Polymer 2 was also extruded to produce nibs for comparison purposes as a control without the addition of calcium carbonate. The nibs were injection molded into test bars of approximately 4.75 in. by 0.5 in. by 0.125 in. dimensions. The test bars were then sliced lengthwise into 3 equal strips and the edges were smoothed off. These strips were tested for flame retardancy.

Standard test method ASTM D2863-77 was used to evaluate the burning behavior of the different blend compositions. This test measures the minimum concentration of oxygen in an oxygen-nitrogen atmosphere that is necessary to initiate and support a flame for 180 seconds on a test strip. The result of the test is expressed as the percentae of oxygen in the oxygen-nitrogen atmosphere and is called the Limiting Oxygen Index (LOI) of the composition.

The LOI values determined for three different blends of the terpolymer of Ilustrative Embodiment I and calcium carbonate are given in Table I together with the LOI of the terpolymer without added calcium carbonate used as a control sample. One can see from the LOI values in Table A that a greater percentage of oxygen was required in an oxygen-nitrogen atmosphere to initiate and support a flame on the samples containing calcium carbonate in comparison to the control sample without calcium carbonate. The flame retardancy of the blend compositions is improved for the samples containing calcium carbonate, however the LOI values are still too low for most commercial applications.

TABLE I

| Sample | % Weight Calcium Carbonate | LOI* |
| --- | --- | --- |
| Control | none | 18.5–19 |
| 1 | 5 | 23–23.5 |
| 2 | 10 | 25.5–26 |
| 3 | 25 | 27–27.5 |

*LOI values are expressed as a range obtained for three duplicate test samples.

Illustrative Embodiment II

A linear alternating terpolymer of carbon monoxide, ethylene and propylene was prepared, hereinafter referred to as Polymer 87-011. Polymer 87-011 was prepared in the presence of a catalyst formed from palladium acetate, the anion of trifluoroacetic acid, and 1,3-bis(diphenylphosphino)propane. Polymer 87-011 had a melting point of 218° C. and an LVN of 1.14.

In Illustrative Embodiment II, four fillers (talc, mica, surface treated mica and calcium carbonate) and a zinc borate flame retardant (Firebrake ZB, having the formula $2ZnO.3B_2O_3.3.5H_2O$) were dry blended with Polymer 87-011 at amounts of 20 and 40% by weight of the filler/flame retardant on a 15 mm Baker Perkins twin-screw extruder. This equipment had no devolatilization capabilities. Extrusion conditions were:

| | |
| --- | --- |
| Atmosphere: | air |
| RMP: | 300 |
| Feed Rate and Torque: | adjusted maximize mixing |
| Temperatures: | 425° F., 454° F., 486°, 456° F. Feed-Die |

All of the extrudates were foamy except for those from the calcium carbonate blends. Some foaming was expected due to the inability to devolatilize. The extrudates were then pelletied, dried at 50° C. for 16 hours, and compression molded into 5"×0.5"×0.125" test schemes for the LOI test.

The LOI results are listed in Table II. As seen in Table II, the compositions containing zinc borate are preferred.

TABLE II
PRELIMINARY SCREENING OF FLAME RETARDANTS FOR POLYKETONE

BASE POLYMER: Polymer 87-011  LVN = 1.14

| FILLER | LEVEL (wt. % based on total blend) | LOI |
|---|---|---|
| Talc | 20% | 22.5 |
| Talc | 40% | 26.5 |
| Zinc Borate | 20% | 27.5 |
| Zinc Borate | 40% | 30.5 |
| Mica | 20% | 24.5 |
| Mica | 40% | 23.5 |
| Surfaced treated Mica | 20% | 21.5 |
| Surfaced treated Mica | 40% | 29.5 |
| Calcium Carbonate | 20% | 22.5 |
| Calcium Carbonate | 40% | 29.5 |

Illustrative Embodiment III

In Illustrative Embodiment III, the polyketone employed was a blend of two specific linear alternating polymers This blend comprised 33% of the novel polyketone polymer 088-005 and 67% of the novel polyketone polymer 088-006. Polymer 088-005 was a linear alternating terpolymer of carbon monoxide, ethylene and 7 wt% propylene prepared by employing a catalyst composition formed from palladium acetate, the anion of trifluroacetic acid and 1,3-bis[di(methoxyphenyl)phosphino]propane. Polymer 088-005 had a melting point of 220° C. and a limiting viscosity number (LVN) measured in 60° C. meta-cresol of 1.79. Polymer 088-006 was a linear alternating polymer prepared in a manner identical to to the 088-005 polymer. The 088-006 polymer had a melting point of 223° C. and an LVN of 1.62. The neat polymer blend was formed by drying mixing pellets of the two polymers 088-005 with 088-006 in a conventional manner. The blended mixture was then melt blended in a 30 mm co-rotating twin screw extruder having seven zones and total L/D of 27/1. The melt temperature at the die exit was 260° C. and the temperatures along the barrel were maintained at about 466° F.

Based on the results from Illustrative Embodiment II, zinc borate was chosen, in conjunction with calcium carbonate, to scale up to larger batch size. About 15 pounds of each of the blends listed in Table III were compounded on a 30 mm ZSK twin-screw extruder.

The goal of this compounding was to incorporate the chosen flame retardants into the polyketone polymer utilizing two stage feed with vacuum devolatilization. The initial screw design was similar to successful screws used when compounding the polyketone with other polymers. This screw was intended to provide good melting and mixing prior to the second stage. This screw ran the neat polymer well; however, severe temperature rises occurred with the downstream addition of a separate flame retardant (Kisuma 5BG magnesium hydroxide). Possible causes for this were thought to be:
1. First stage too intense. Melt temperature at the point of flame retardant addition triggered foaming of retardant.
2. Insufficient mixing of flame retardant and polymer in second stage.

A single feed, gentle mixing screw was assembled to eliminate the severe temperature rise, and the Firebrake ZB blends compounded satisfactorily.

The blends were pelletized, dried at 160° F. for 16 hours, and injection molded into the test specimens. Room temperature Notched Izod, Flex Modulus and LOI tests were run.

All test results are listed in Table III.

TABLE III
PHYSICAL PROPERTIES OF FLAME RETARDED POLYKETONE POLYMER

| COMPOSITION | NOTCHED IZOD ft.-lb/in. | FLEX MOD. psi | LOI |
|---|---|---|---|
| Polymer Blend 88-005,006 | 3.00 | 260,000 | 17.5 |
| Polymer Blend 88-005,006/Zinc Borate/ CaCO3 | | | |
| 80/10/10 | 0.94 | 325,000 | 24.5 |
| 70/20/10 | 0.75 | 410,000 | 27.5 |
| 60/30/10 | 0.52 | 480,000 | 30.5 |
| 75/20/5 | 0.75 | 370,000 | 29.5 |

Note:
All samples had 0.3% Ethanox 330 added based on Polyketone content.
All samples were compounded in a 30 mm ZSK Twin Screw Extruder and injection molded.
*The amounts listed are weight percent based on total composition.

As can be seen above, acceptable LOI values are obtained with a combination of zinc borate and CaCO3 flame retardants.

What is claimed is:

1. A flame retardant polymer composition comprising a linear alternating polymer of carbon monoxide and at least one ethylenically unsaturated hydrocarbon and a flame retarding quantity of a zinc borate.

2. The composition of claim 1 wherein said polymer is a linear alternating polymer having the repeating units

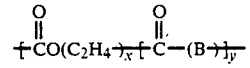

wherein B is the moiety of an ethylenically unsaturated α-olefin of at least 3 carbon atoms polymerized through the ethylenic unsaturation and the ratio of y:x is no more than about 0.5.

3. The composition of claim 1 wherein said ethylenically unsaturated α-olefin is propylene.

4. The composition of claim 1 wherein said quantity of zinc borate is about 2 to about 50 percent by weight, based on the total composition.

5. The composition of claim 4 wherein said quantity of zinc borate is about 15 to about 40 percent by weight, based on the total composition.

6. The composition of claim 1 wherein said zinc borate has the formula $xZnO \times yB_2O_3 \times zH_2O$ where x is 2, y is 3 and z is 3.3 to 3.7.

7. The composition of claim 6 wherein said zinc borate has the formula $2ZnO \times 3B_2O_3 \times 3.5\ H_2O$.

8. The composition of claim 2 wherein the α-olefin is propylene and the ratio of y:x is from about 0.01 to about 0.2.

9. The composition of claim 2 wherein y is zero.

10. As an article of manufacture, a fabricated article comprising the composition of claim 1.

11. A flame retardant composition comprising:
(a) about 50 to about 85 percent by weight of a linear alternating polymer of carbon monoxide and at least one ethylenically unsaturated hydrocarbon;

(b) about 5 to about 30 percent by weight of a zinc borate; and (c) about 5 to about 20 percent by weight of an alkaline earth metal carbonate, wherein the weight ration of said zinc borate to said alkaline earth metal carbonate is 1:1 or greater.

12. The composition of claim 11 wherein said alkaline earth metal carbonate is calcium carbonate.

13. The composition of claim 12 wherein the amount of said linear alternating polymer is about 60 to about 85 percent by weight, the amount of said zinc borate is about 20 to about 30 percent of weight and the amount of said calcium carbonate is about 5 to about 10 percent by weight.

14. The composition of claim 11 wherein said zinc borate has the formula $xZnO \times yB_2O_3 \times zH_2O$, where x is 2, y is 3 and z is 3.3 to 3.7.

15. The composition of claim 14 wherein said zinc borate has the formula $2ZnO \times 3B_2O_3 \times 3.5\ H_2O$.

16. The composition of claim 12 wherein said calcium carbonate is surface treated.

17. The composition of claim 16 wherein said calcium carbonate is surface treated with stearic acid.

18. The composition of claim 11 wherein said polymer is a linear alternating polymer having the repeating units

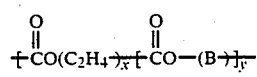

wherein B is the moiety of an ethylenically unsaturated α-olefin of at least 3 carbon atoms polymerized through the ethylenic unsaturation and the ratio of y:x is no more than 0.5.

* * * * *